United States Patent [19]

Sumiyoshi

[11] 3,821,799

[45] June 28, 1974

[54] MAGNETIC RECORDING AND REPRODUCING APPARATUS WHICH PREVENTS ERASING DURING TAPE LOADING

[75] Inventor: Koichiro Sumiyoshi, Tokyo, Japan

[73] Assignee: Sony Corporation, Tokyo, Japan

[22] Filed: Nov. 19, 1971

[21] Appl. No.: 200,540

[30] Foreign Application Priority Data

Nov. 24, 1970 Japan ........................ 45-116715[U]

[52] U.S. Cl. ......................360/60, 360/85, 360/95

[51] Int. Cl.... G11b 15/66, G11b 23/04, G11b 5/52

[58] Field of Search ..............179/100.2 Z, 100.2 T, 179/100.2 MD, 100.2 D; 242/55.19 H, 194, 197, 199; 274/4 C, 4 D; 226/49, 91

[56] References Cited

UNITED STATES PATENTS

| | | | |
|---|---|---|---|
| 3,354,270 | 11/1967 | Smith et al. | 179/100.2 D |
| 3,541,573 | 11/1970 | Ault et al. | 179/100.2 D |
| 3,643,038 | 2/1972 | Sato | 179/100.2 T |
| 3,647,984 | 3/1972 | Watanabe | 179/100.2 Z |
| 3,660,614 | 5/1972 | Swain et al. | 179/100.2 Z |
| 3,665,114 | 5/1972 | Hathaway | 179/100.2 T |
| 3,665,120 | 5/1972 | Larkin | 179/100.2 Z |
| 3,674,942 | 7/1964 | Sugaya et al. | 179/100.2 ZA |

FOREIGN PATENTS OR APPLICATIONS

| | | | |
|---|---|---|---|
| 1,537,240 | 10/1969 | Germany | 178/100.2 T |

OTHER PUBLICATIONS

Automatic Tape Threading, Johnson et al., IBM Technical Disclosure Bulletin, Vol. 9, No. 8, Jan. 1967.

*Primary Examiner*—Bernard Konick
*Assistant Examiner*—Alfred H. Eddleman
*Attorney, Agent, or Firm*—Lewis H. Eslinger, Esq.; Alvin Sinderbrand, Esq.

[57] ABSTRACT

In a magnetic recording and reproducing apparatus with an automatic tape loading device for drawing a magnetic tape from between reels on which it is wound, for example, in a cassette or cartridge, and wrapping or loading the withdrawn tape about a guide drum having at least one rotary magnetic head associated therewith to scan the tape on the drum during recording and reproducing apparatus, and in which an erasing head is provided to erase signals on the tape prior to the scanning thereof by the rotary head during recording operations; a single manually actuable recording control is provided to initiate the recording operation by first causing operation of the tape loading device, and the completion of the tape loading operation is detected, for example, by automatic actuation of a switch in response thereto, to only then permit energization of the erasing head, and preferably also of a recording circuit, for avoiding erasure from the tape of signals which it is desired to retain or the undesired recording on the tape of the erasing signal in the form of noise.

7 Claims, 3 Drawing Figures

INVENTOR
KOICHIRO SUMIYOSHI
BY

ATTORNEY

INVENTOR
KOICHIRO SUMIYOSHI
BY

ATTORNEY

INVENTOR
KOICHIRO SUMIYOSHI
BY

ATTORNEY

MAGNETIC RECORDING AND REPRODUCING APPARATUS WHICH PREVENTS ERASING DURING TAPE LOADING

This invention relates generally to magnetic recording and reproducing apparatus, such as, video tape recording and reproducing apparatus (VTR), and more particularly is directed to improvements in such apparatus provided with an automatic tape loading device.

Generally, a VTR comprises one or more rotaty magnetic heads operative to record or reproduce signals on a magnetic tape where the latter is wrapped about a guide drum as the tape is driven by a capstan, pinch roller and take-up reel.

In order to operate a VTR, the tape must be placed around or wrapped on the drum for guiding the tape with respect to the rotary magnetic head or heads. Generally, in the past, it has been necessary for the user to manually thread the tape from a supply reel past various guides on the VTR chassis, around the guide drum and thence back to the take-up reel. This operation requires a considerable degree of manual dexterity and can be time consuming. If the tape is not properly threaded, it can jam the mechanism and, if the operator's fingers have any foreign matter thereon, it can be passed to the tape and adversely affect its fidelity.

Automatic tape loading devices have been suggested in order to overcome the aforementioned disadvantages. A particularly desirable automatic tape loading device for a video tape recording and/or reproducing apparatus or VTR is disclosed in copending U.S. Pat. application Ser. No. 113,988, filed Feb. 9, 1971 in the name of Nobutoshi Kihara, and having a common assignee herewith. In such automatic tape loading device, a rotatable support, for example, in the form of a ring, extends around the guide drum and carries a plurality of guides, and a tape engaging member is also mounted on the ring or support member and is movable into and out of a guide path which is defined by the guides and spaced from the surface of the guide drum. The tape engaging member, in an inactive condition of the apparatus, is displaced out of the guide path to engage the magnetic tape between the supply and take-up reels which may be contained in a cassette or cartridge, and, upon turning of the ring, the tape engaging member is moved into the guide path to draw a loop of the tape from the cassette or cartridge and to wrap one side of the loop about the guide drum while the other side of the loop is engaged by the guides and maintained in the corresponding guide path spaced from the periphery of the drum. When the VTR is intended for recording as well as reproducing or playback operations, a stationary erasing head is situated between the drum and the cassette or cartridge so as to be proximate to the run of the tape extending from the supply reel to the guide drum for erasing signals on the tape prior to the scanning thereof by the rotary head during recording operations.

In order to simplify the manual operations required of the operator, it is desirable that, after the positioning of a cassette or cartridge in the VTR, the manual actuation of a single control, for example, a "record" pushbutton, should be effective to cause operation of the tape loading device for wrapping the tape about the guide drum, and simultaneously also effective to condition an electrical recording circuit so that recording can proceed immediately upon the completion of the tape loading operation without further action by the operator or user of the VTR. However, if the erasing head is energized during the operation of the tape loading device, that is, during the drawing of the loop of tape from the cassette or cartridge, any signals recorded on the tape at the side of the tape loop moving past the erasing head will be erased from the tape or, in the case where no previously recorded signals appear on the side of the tape loop that moves past the erasing head during operation of the tape loading device, the erasing signal will be recorded thereon in the form of noise. When the operation of the tape loading device is concluded, at least a portion of the length of the tape from which signals have been erased, or in which the erasing signal has been recorded in the form of noise, as aforesaid, weill be positioned beyond the length of the tape wrapped about the guide drum for scanning by the rotary head or heads. Thus, recorded signals which it is desired to retain may be erased during the tape loading operation so that upon subsequent reproduction or playback of signals recorded on the tape, there will be a gap in the recorded signals to be reproduced or such gap may contain the erasing signal recorded therein in the form of noise.

Accordingly, it is an object of this invention to provide a magnetic recording and reproducing apparatus ur VTR with an automatic tape loading device in which the above mentioned problems are overcome while simplifying the manual operations required of the operator to initiate the tape loading an recording operations.

A more specific object is to provide a magnetic recording and reproducing apparatus or VTR with an automatic tape loading device in which manual actuation of a single control, for example, a "record" pushbutton, is effective to initiate operation of the tape loading device and, only in response to the completion of the tape loading operation, the erasing head and a recording circuit are automatically energized or activated without further intervention by the operator.

In accordance with an aspect of this invention, a magnetic recording and reproducing apparatus having an automatic tape loading device for wrapping or loading the tape about at least a portion of the guide drum, as aforesaid, and a fixed magnetic erasing head located to engage the tape running to the guide drum for erasing signals on the tape when energized by a respective circuit, is provided with means, for example, a switch actuated in response to completion of the operation of the tape loading device, to permit energization of the erasing head only after the tape has been wrapped on the guide drum, thereby to avoid erasure of signals which should be retained on the tape or the recording of the erasing signal on the tape in the form of noise.

The above, and other objects, features and advantages of the invention, will be apparent in the following detailed description of an illustrative embodiment which is to be read in connection with the accompanying drawings, wherein.

Figure 1:
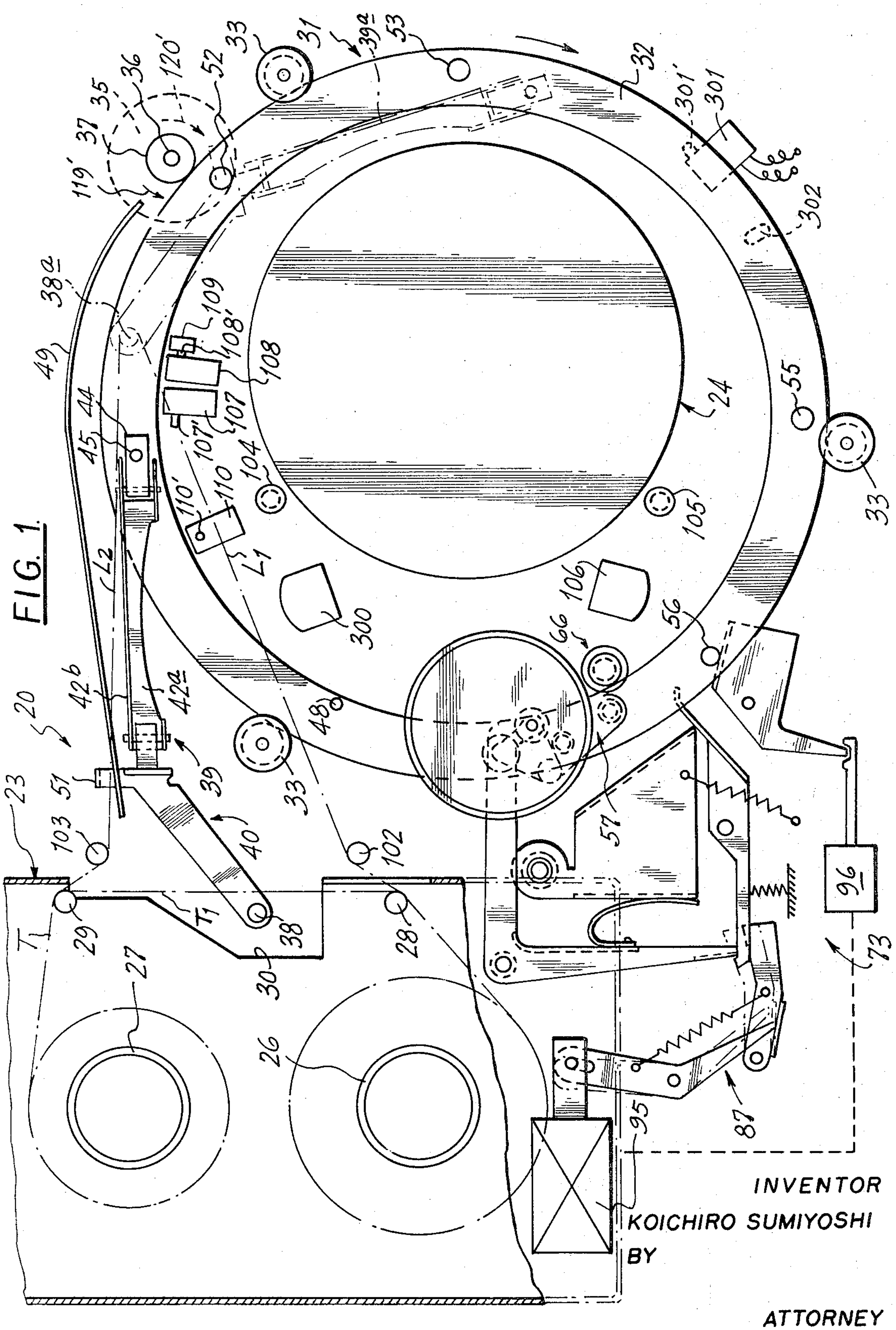
FIG. 1 is a schematic top plan view of an automatic tape loading device for a magnetic recording and reproducing apparatus embodying this invention.
Figure 2:
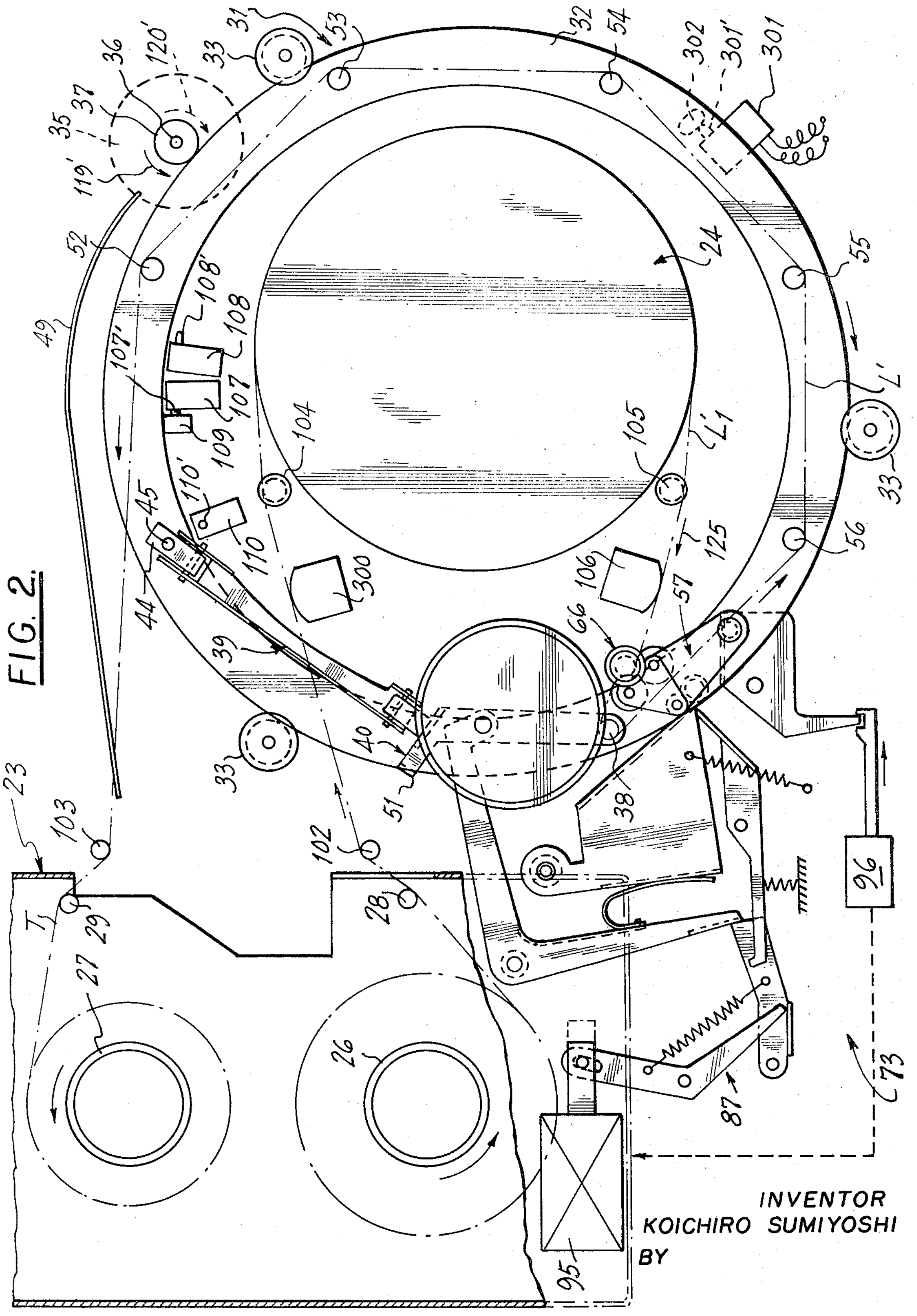
FIG. 2 is a view similar to that of FIG. 1, but showing the tape loading device in another position thereof.

Referring to the drawings in detail, and initially to FIGS. 1 and 2 thereof, it will be seen that the invention is there shown applied to an automatic tape loading device of a cassette-type video tape recording and reproducing apparatus or VTR 20 which is described in detail in the copending U.S. application Ser. No. 113,998, which is identified more fully above. However, it should be understood that the invention is equally applicable to any other magnetic recording and reproducing apparatus in which the magnetic tape is carried by supply and take-up reels and is drawn from between such reels and wrapped at least partly about a guide drum having a magnetic head or heads associated therewith for scanning the tape guided by the drum.

Figure 3:
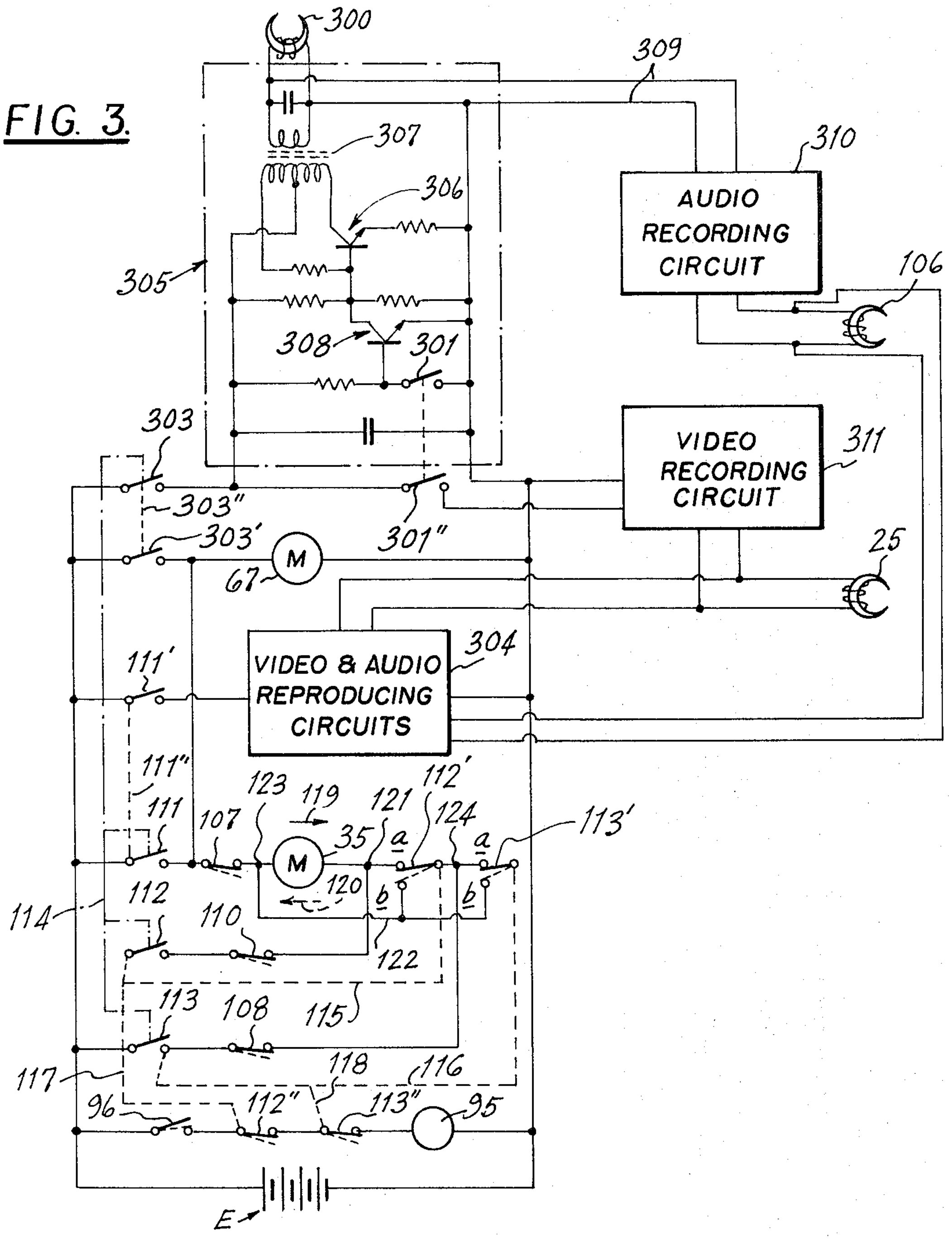
FIG. 3 is a schematic circuit diagram showing a system for controlling the operation of the apparatus of FIGS. 1 and 2 in accordance with this invention.

The cassette-type VTR 20 is hereinafter described only to the extent necessary for an understanding of the present invention and generally comprises a chassis having a cassette holder (not shown) mounted above the forward portion of the chassis to receive and support a cassette 23 containing a supply of magnetic tape. The apparatus 20 is further shown to comprise a tape guide drum 24 suitably mounted above the back portion of the chassis 21 and defining a circumferential slot in which one or more rotary magnetic heads indicated at 25 on FIG. 3 are exposed to scan the magnetic tape when the latter is wrapped about a predetermined extent of the periphery of drum 24.

The magnetic tape T is shown to be wound on a supply reel 26 and a take-up reel 27 which are rotatable within cassette 23, and the tape T extends over guide pins 28 and 29 which are disposed at opposite sides of an opening 30 provided at the back portion of cassette 23 so that a run $T_1$ of the tape extending between reels 26 and 27 will be exposed at cassette opening 30, as shown on FIG. 1.

The automatic tape loading device to which this invention is shown applied is generally identified by the numeral 31 and comprises a support member 32, for example, in the form of a circular ring which extends around drum 24. The ring 32 is supported for rotation about its center, for example, by a number of grooved rollers or pulleys 33 which engage the periphery of ring 32 at locations spaced apart about the latter and which are rotatably supported above the chassis. The support ring 32 may be advantageously mounted so that its plane of rotation slopes downwardly in the forward direction below the plane of rotation of reels 26 and 27, whereas the drum 24 is mounted so that the plane of rotation of its magnetic head or heads also slopes downwardly in the forward direction so as to substantially bisect the angle included between the plane of rotation of the reels and the plane of rotation of support ring 32. As is shown particularly on FIG. 1, the cassette 23 is preferably laterally offset with respect to the axis of drum 24, and ring 32 is eccentrically located with respect to drum 24 so that the center of rotation of ring 32 is displaced forwardly, that is, in the direction toward cassette 23, from the axis of drum 24.

Support ring 32 is turned by a reversible D.C. electric motor 35 (shown in broken lines on FIGS. 1 and 2) which is suitably mounted at the underside of the chassis and has its shaft 36 extending upwardly through an opening in the chassis adjacent the periphery of ring 32 and carrying a rubber-surfaced drive roller 37 which frictionally engages the periphery of the ring. Thus, by suitable control of motor 35, support ring 32 can be turned in the clockwise or tape loading direction from its inactive position shown on FIG. 1 to its operative position shown on FIG. 2, and, similarly, for unloading the tape, ring 32 can be turned in the counterclockwise direction from its operative position shown on FIG. 2 to its initial or inactive position shown on FIG. 1.

A tape engaging member 38 which is shown in the form of an upstanding, rotatable flanged pin or roller is mounted, by way of an arm assembly 39, on support ring 32 so as to move with the latter during turning of the support ring while being movable relative to ring 32 both in the directions generally toward and away from the center of rotation of the ring and in directions generally perpendicular to the plane of rotation of ring 32. As shown, the arm assembly 39 may include a bracket 40 having the tape engaging member 38 extending upwardly from its free end portion, and generally parallel arms or links 42*a* and 42*b* which are pivotally connected, at one end, to bracket 40 and, at the opposite end, pivotally conencted to a bracket 44 swingable on a pivot 45 carried by support ring 32 and extending generally perpendicular to the plane of rotation of the latter. It will be apparent that upward and downward swinging of the parallel arms or links 42*a* and 42*b* permits upward and downward movement of the tape engaging member 38, that is, movement in directions generally perpendicular to the plane of rotation of ring 32 with the tape engaging member 38 remaining substantially erect during such movement, whereas swinging of bracket 44 about pivot 45 permits movement of tape engaging member 38 outwardly away from ring 32, for example, to the position shown on FIG. 1, or inwardly to a position above ring 32, for example, as shown on FIG. 2.

A tension spring (not shown) may extend diagonally between links 42*a* and 42*b* for yieldably urging links 42*a* and 42*b* to swing downwardly toward ring 32, and a torsion spring (not shown) may be provided around pivot pin 45 for yieldably urging arm assembly 39 to swing about pivot pin 45 in the counterclockwise direction, as viewed on FIG. 1, that is, to yieldably urge tape engaging member 38 to the position above ring 32, as shown on FIG. 2. The inward swinging of arm assembly 39 about pivot 45 may be limited by a stop 48 (FIG. 1) extending upwardly from ring 32 and being engageable by bracket 40, while the downward swinging of the arm assembly may be limited by the engagement of bracket 40 with the upper surface of ring 32.

In order to dispose tape engaging member 38 in the position shown on FIG. 1 when ring 32 is in its inactive position, that is, in order to raise arm assembly 39 and swing the latter outwardly relative to ring 32, the tape loading device 31 further includes an arcuate cam plate 49 suitably fixed relative to the chassis so as to extend along a portion of cam ring 32 and to diverge forwardly from the latter to adjacent the cassette 23. A bent tab 51 extends outwardly and then downwardly from bracket 40 and is slidably engageable over the top edge of cam plate 49 to act as a cam follower. The top edge of cam plate 49 is shaped so that, during turning of ring 32 in the counterclockwise direction from the position of FIG. 2 to the inactive position of FIG. 1, bent tab 51 acting as a cam follower comes into engagement with the top edge of cam plate 49 and thereafter moves along the cam plate for both raising arm assembly 39 and swinging the arm assembly outwardly away from ring 32. When ring 32 is disposed in its inactive position shown on FIG. 1, cam plate 49 positions arm assembly 39 so that the tape engaging member 38 carried by the latter will extend upwardly into opening 30 at the back of cassette 23 and be disposed in front of the run $T_1$ of the tape which extends between guide pins 28 and 29 and is exposed at the cassette opening. Of course, it is intended that tape engaging member 38 should be disposed at the position shown on FIG. 1 prior to the positioning of the cassette 23 at the operative position thereof, and further that the cassette 23 should be moved downwardly from above to its operative position, whereby the downward movement of the cassette results in the entry of tape engaging member 38 into cassette opening 30.

Support ring 32 further carries a series of guide pins 52, 53, 54, 55 and 56 which extend upwardly from the ring at spaced apart locations along approximately the half of ring 32 which is diametrically opposed to that portion of the ring along which arm assembly 39 extends when it is in overlying relation to the ring as shown on FIG. 2. The guide pins 52–56 define a guide path spaced from the periphery of drum 24 and are engageable by the tape, as hereinafter described, when device 31 is operated to wrap a portion of the tape on a predetermined peripheral extent of drum 24.

Also mounted on support ring 32 between guide pin 56 and the location of tape engaging member 38 when the latter is disposed above ring 32, as on FIG. 2, is a pinch roller assembly 57, and a capstan 66 which may be driven by a motor 67 (FIG. 3) is disposed inside the circular path of travel of ring 32 and located so that pinch rollers of assembly 57 will be adjacent thereto when ring 32 is turned to its operative position (FIG. 2). The illustrated tape loading device 31 further comprises a pressing assembly 73 which is operative to press the pinch rollers of assembly 57 against capstan 66 with the tape therebetween upon the attainment by ring 32 of its operative position shown on FIG. 2. The pressing assembly 73 is fully described in the copending U.S. application Ser. No. 113,988 identified more fully above and forms no part of this invention. However, it may be mentioned that the pressing assembly 73 generally includes a latch device 87 which is set by energizing of a solenoid 95 in response to closing of a switch 96 when ring 32 attains its operative position (FIG. 2). Setting of latch device 87 retains pressing assembly 73 in its operative condition for pressing the pinch rollers of assembly 57 against capstan 66, and latch device 87 is released to permit return of pressing assembly 73 to its inoperative condition (FIG. 1), and thereby freeing pinch roller assembly 57 from capstan 66, upon deenergizing of solenoid 95.

In order to further guide the tape withdrawn from cassette 23, apparatus 20 has fixed guide pins 102 and 103 disposed in back of the location of cassette 23 when the latter is supported on the cassette holder and located adjacent the guide pins 28 and 29, respectively, of the cassette. Further, a fixed guide pin 104 is disposed adjacent drum 24 approximately on a line extending tangentially from guide pin 102 to the surface of drum 24, and a guide pin 105 is disposed adjacent drum 24 approximately on a line extending tangentially between drum 24 and capstan 66. Preferably, guide pin 104 is substantially erect and is at a level that corresponds to that of the tape being withdrawn from cassette 23, and guide pin 105 is inclined from the vertical so as to be substantially perpendicular to the plane of rotation of ring 32 and is at a level substantially lower than that of guide pin 104 for engagement with the tape run extending from the surface of drum 24 to the tape engaging member 38 when ring 32 is in its operative position indicated on FIG. 2.

A fixed magnetic recording and/or reproducing head 106 is mounted on the chassis between capstan 66 and guide pin 105 so as to be engaged by the tape when ring 32 is in its operative position, and such fixed magnetic head 106 may be employed for recording and/or reproducing audio and/or control signals on the tape, whereas the rotary head or heads associated with drum 24 may be used for recording and/or reproducing video signals in skewed tracks extending obliquely across the tape.

A fixed magnetic erasing head 300 is also mounted on the chassis between guide pins 102 and 104 so as to be engaged by the tape between supply reel 26 and the surface of drum 24 when ring 32 is in its operative position (FIG. 2). The erasing head 300 may be supplied with erasing signals, as hereinafter described in detail, and by which, during recording operation of VTR 20, signals already recorded on the tape are erased prior to the recording of signals on the tape by the rotary head or heads associated with drum 24.

In order to limit the turning of ring 32 to its operative position shown on FIG. 2 and the return movement of the ring to its inactive position shown on FIG. 1, tape loading device 31 is shown to have limit switches 107 and 108 (FIGS. 1 and 2) suitably mounted on the chassis adjacent ring 32 and having actuators 107' and 108', respectively, which are selectively depressed by a switch operating member 109 on the ring when ring 32 is in its operative position and in its inactive position, respectively. The switches 107 and 108 are interposed in electrical circuits (not shown) for motor 35 and are normally closed and selectively opened by the engagement of switch operating member 109 with their respective actuators 107' and 108'. Device 31 further has a normally closed switch 110 also mounted on the chassis adjacent ring 32 and being spaced a relatively small angular distance, for example, approximately 30°, from switch 107 in the counterclockwise direction, as viewed on FIGS. 1 and 2, so that the actuator 110' of switch 110 will be engaged by switch operating member 109 to open the normally closed switch 110 when ring 32 is turned by the described relatively small angular extent in the counterclockwise direction from its operative position shown on FIG. 2.

In accordance with this invention, still another switch 301 is mounted on the chassis adjacent ring 32, and the latter carries a switch operating member 302 which is engageable with the actuator 301' of switch 301 only when ring 32 is in its operative position (FIG. 2) for permitting the erasing operation of head 300 only after the operation of tape loading device 31 has been completed, as hereinafter described in detail. The switch 301 is normally open and is actuated to its closed condition only when the switch actuator 301' is depressed by the engagement of member 302 therewith.

Referring now to FIG. 3, it will be seen that the controls for the VTR 20 may comprise a "play" switch 111, an "instantaneous stop" switch 112, a "full stop" switch 113 and a "record" switch 303 which may be arranged adjacent to each other at a control panel of the recording and reproducing apparatus or VTR 20 and which are normally open, as shown. The switches 111, 112, 113 and 303 are selectively actuable to their closed positions, for example, by manual operation of respective pushbuttons. Further, by means of conventional mechanical latching devices (not shown), each of the switches 111, 112, 113 and 303 may be held in its closed position following actuation of its respective pushbutton, and the latching devices are mechanically interconnected in a conventional manner and as schematically indicated by the dot-dash line 114 on FIG. 3 so that, upon the actuation of any one of the switches 111, 112, 113 and 303 to its closed position, any other one of the switches 111, 112, 113 and 303 previously held or latched in its closed position is released and returned to its normally open position. The switches 112 and 113 are further shown to be ganged or mechanically interconnected, as indicated by the broken lines 115 and 116, with reversing switches 112' and 113', respectively. The switches 112' and 113' normally close their respective contacts *a* when the switches 112 and 113, respectively, are in their normal open positions. In response to closing of the switches 112 and 113, the ganged switches 112' and 113' are respectively actuated to engage their contacts *b*. The switches 112 and 113 are further ganged or mechanically connected with switches 112'' and 113'', respectively, which are normally closed and actuated to their open conditions in response to closing of the respective switches 112 and 113. The switches 111 and 303 are also shown to be ganged or mechanically interconnected, as indicated by the broken lines 111'' and 303'', with switches 111' and 303', respectively, which are opened and closed with the respective switches 111 and 303.

As shown, the reversible D.C. motor 35 for driving support ring 32 is connected to the opposite terminals of an electrical source E through switches 111 and 303', in parallel with each other and in series with switch 107, and through contacts *a* of switches 112' and 113' in series, respectively. Thus, when "play" switch 111 is closed, or when "record" switch 303 is closed to close switch 303', and switches 112' and 113' are in their normal positions indicated in full lines on FIG. 3, current flows through motor 35 in the direction of the arrow 119 until such time as limit switch 107 is opened, and such current flow through motor 35 effects rotation of its shaft in the direction of the arrow 119' on FIGS. 1 and 2 for turning ring 32 in the clockwise direction. The switches 112 and 110 are shown to be connected in series between one terminal of source E and a junction 121 between motor 35 and contact *a* of switch 112', and a conductor 122 extends from a junction 123 between motor 35 and limit switch 107 and is connected to contact *b* of both switches 112' and 113'. The switches 113 and 108 are shown to be connected in series between a terminal of source E and a junction 125 between switch 112' and contact *a* of switch 113'. Switches 112'' and 113'' are shown to be connected in series with the previously described switch 96 in the circuit for energizing solenoid 95 of the latch device 87. When the switch 112 or the switch 113 is closed, the effect of such closure and of the consequent actuation of the reversing switch 112' or 113' is to cause current flow through motor 35 in the direction of the arrow 120 on FIG. 16, with the result that the motor is rotated in the direction of the arrow 120' on FIGS. 1 and 2 for effecting turning of support ring 32 in the counterclockwise direction.

As shown, the motor 67 for driving capstan 66, which may also drive the rotary head or heads 25, is connected to source E through switches 111 and 303', in parallel, so as to be energized for driving capstan 66 and head or heads 25 when either the "play" switch 111 or the "record" switch 303 is manually actuated and retained in the closed position thereof. It will also be seen that the switch 111' ganged with "play" switch 111 is connected between source E and a conventional reproducing circuit 304 to energize the latter in response to closing of switch 111, whereby circuit 304 is operative to cause recording operation of the rotated video head or heads 25 and of the stationary audio head 106.

The normally open switch 301 is shown on FIG. 3 to be included in a circuit 305 provided for supplying an erasing signal to the erasing head 300 and which is connected with the source E through "record" switch 303. Thus, upon the selection of the recording operation of VTR 20 by manual actuation of switch 303 to its closed position, erasing signal supply circuit 305 is connected to power source E, but the supplying of the erasing signal to head 300 does not occur until switch 301 is closed, that is, detects the completion of the tape loading operation of device 31. FIG. 3 illustrates an example of the erasing signal supply circuit 305 which includes a transistor 306 constituting an oscillator circuit the output of which is supplied to erasing head 300 by way of a transformer 307. Also included in the circuit 305 is a transistor 308 which is connected to transistor 306 and switch 301, as shown, so that, so long as switch 301 is open, transistor 308 is conductive and, accordingly, the base of transistor 306 is not biased to prevent operation of the oscillator constituted by transistor 306. However, when switch 301 is closed in response to the completion of the tape loading operation of device 31, transistor 308 is turned-off or rendered non-conductive with the result that the base of transistor 306 is properly biased and acts as an oscillator to provide the erasing signal supplied to erasing head 300.

In the embodiment illustrated in FIG. 3, the erasing signal is further supplied by way of conductors 309 to a conventional audio recording circuit 310 to serve as a bias current for the fixed audio head 106. Further, if desired, switch 301 may be provided with additional normally open contacts 301'' connected in series with switch 303 in a circuit for energizing or supplying power to a conventional video recording circuit 311 connected with rotary head or heads 25 so that the latter also commence to record signals on the tape only after the contacts 301'' of switch 301 are closed in response to the completion of the tape loading operation of device 31.

The VTR with a tape loading device 31 according to this invention operates as follows:

With ring 32 initially in its inactive position shown on FIG. 1, and a cassette 23 located on the holder therefor, tape engaging member 38 extends upwardly into opening 30 at the back of the cassette and engages in front of the tape run $T_1$ exposed at such opening. Upon closing of "play" switch 111, current is made to flow from source E through switches 111 and 107, through motor 35 in the direction of arrow 119 and then through contacts *a* of switches 112' and 113' back to the source. Thus, motor 35 is driven in the direction of the arrow 119' on FIG. 1 to cause a clockwise rotation of ring 32. During such clockwise rotation of ring 32 away from its inactive position, tape engaging member 38 is moved with the support ring and withdraws tape from the cassette to form a tape loop L. It will be seen that the tape loop L thus formed includes a side or run $L_1$ extending from tape engaging member 38 past erasing head 300 to guide pin 102 and facing toward drum 24 and a side or run $L_2$ extending between tape engaging member 38 and guide pin 103 and facing away from the guide drum. During the initial clockwise turning of support ring 32, the pinch roller assembly 57 and the adjacent guide pin 56 move into the loop L between the runs $L_1$ and $L_2$ thereof and, as clockwise rotation of ring 32 is continued, for example, to the operative position shown on FIG. 2, the tape loop is progressively lengthened, for example, as indicated at L' on FIG. 2, and the other guide pins 55, 54, 53 and 52 move successively into such enlarged loop. The movement of pinch roller assembly 57 and the successive guide pins 56–52 into the progressively enlarging loop under the tape run extending between guide pins 102 and 104 is made possible by the described slanting plane of rotation of support ring 32 which results in the ring 32 and the elements carried thereby being at a relatively low level at the portion of the ring between drum 24 and cassette 23.

During the described clockwise rotation of ring 32 to the operative position shown on FIG. 2, the side $L'_1$ of the progressively enlarged loop L' is wrapped about a substantial peripheral extent of drum 24 and the run of that side of the loop extending from drum 24 to tape engaging member 38 is brought adjacent capstan 67 and the fixed magnetic head 106, as shown on FIG. 2. Further, as the tape loop is progressively lengthened, the other side $L'_2$ thereof which extends from tape engaging member 38 to guide pin 103 is engaged by guide pins 52–56 on ring 32, and such guide pins 52–56 define a guide path for holding the side $L'_2$ of the lengthened loop away from the surface of drum 24 and away from the fixed heads 106 and 300.

Further, by reason of the slanting plane of rotation of ring 32, the tape engaging member 38 is moved to a relatively low level when it reaches the position shown on FIG. 2 so that the side $L'_1$ of the tape loop L' which is wrapped around a substantial peripheral extent of the drum 24 forms a portion of a helix on the surface of the drum, that is, is inclined with respect to the plane or rotation of the rotary head or heads 25 so that such head or heads will scan skewed tracks on the tape.

When ring 32 reaches the position shown on FIG. 2, switch operating member 109 engages actuator 107' of switch 107 to open the latter and, as is apparent from FIG. 3, to interrupt the circuit for passing current through motor 35 in the direction of the arrow 119. Hence, turning of ring 32 is halted at its operative position.

As previously described, the movement of ring 32 to its operative position causes release of the latch lever 83 and also the closing of switch 96 so that pressing assembly 73 is operated to press the pinch rollers of assembly 57 against capstan 66 with the tape therebetween for driving the tape in the direction of the arrow 125 on FIG. 2. So long as solenoid 95 remains energized by the closing of switch 96 and the maintenance of switches 112'' and 113'' in their normal closed positions, latch device 87 is effective to cause pressing assembly 73 to maintain the pinch rollers against the capstan while the latter is driven by motor 67 energized through closed switch 111, so that the tape is continuously driven in the direction of the arrow 125 for unwinding from supply reel 26 and rewinding on the take-up reel 27. Further, the closing of switch 111' with switch 111 causes operation of the recording circuits 304 so that heads 25 and 106 are operative to playback or reproduce video signals and audio signals, respectively, on the continuously driven tape.

If operation of the VTR 20 is initiated by actuation of the "record" switch 303 rather than the "play" switch 111, that is, if recording operation is selected instead of reproducing operation, the closing of switch 303' with switch 303 again causes current to flow through motor 35 in the direction of arrow 119 on FIG. 3, as described above, so that motor 35 is driven in the direction to cause clockwise turning of ring 32 from the inactive position of FIG. 1 to the operative position of FIG. 2 for withdrawing a loop L' of the tape from the cassette 23 and wrapping one side of the loop on drum 24. However, since switch 301 remains open until ring 32 attains its operative position shown on FIG. 2, circuit 305 does not supply the erasing signal to erasing head 300 during the tape loading operation of device 31. Thus, there is no possibility that the head 300 will inadvertently erase signals from the run or side $L_1$ of the tape loop, or record the erasing signal in the form of noise on such run or side of the tape loop, as the latter is withdrawn from the cassette during the tape loading operation. Further, by reason of the use of the circuit 305 to supply the bias current for the audio head 106, the latter will not be operative to record on the tape until the loading or wrapping of the tape about drum 24 has been completed. It will also be seen that, if the energizing of the video recording circuit 311 is made dependent upon the closing of the switch contacts 301'' with the switch 301, as shown on FIG. 3, the recording operation of head or heads 25 will also not commence until the tape loading operation is completed. Thus, although the recording operation is initiated by the manual actuation of a single control, that is the closing of switch 303, the erasing operation of head 300, and the recording operation of heads 25 and 106 only commence automatically in response to the closing of switch 301, that is, the detection of the completion of the tape loading operation.

When it is desired to halt the recording or reproducing operation of apparatus 20 without unwrapping or unloading the tape from aroud drum 24, the "instantaneous stop" switch 112 is closed and, as a result of the interconnection of the mechanical latching mechanisms indicated at 114, the previously closed "play" switch 111 or "record" switch 303 is released and returned to its open position. Closing of switch 112 causes displacement of switch 112' to the position shown in broken lines on FIG. 14 to close its contact *b*, by reason of the mechanical conection indicated at 115, and further causes opening of the switch 112'' by reason of the mechanical connection 117. The opening of switch 112'' deenergizes solenoid 95 to release latch device 87 and allow pressing assembly 73 to permit the freeing of pinch roller assembly 57 from capstan 66. The closing of switch 112 completes an energizing circuit for the motor 35 from source E through switches 112 and 110, through motor 35 in the direction of the arrow 120, through conductor 122 to switch 112' by way of its closed contact *b*, and then through switch 113' back to source E. Thus, simultaneously with the release of latch device 87 and the consequent removal from pinch roller assembly 57 of the force urging the pinch rollers against capstan 66, ring 32 is turned in the counterclockwise direction from the position shown on FIG. 2 until switch operating member 109 moves from the position shown on FIG. 2 to a position where it engages the actuator 110' of switch 110 for opening the latter. It will be apparent that opening of switch 110 interrupts the circuit for energizing motor 35 and hence ring 32 halts at a position that is angularly displaced from its operative position by approximately 30°. Such angular displacement of ring 32 is sufficient to remove the tape from engagement with capstan 66 so that driving of the tape is halted while the side $L'_1$ of the tape loop remains substantially in wrapped engagement with the periphery of drum 24. It is further apparent that counterclockwise turning of ring 32 from the position of FIG. 2 removes the switch operating member 302 from engagement with actuator 301' of switch 301, whereby the latter returns to its normal open condition. Thus, if the "instantaneous stop" switch 112 is closed during recording operation of apparatus 20, the opening of switch 301 stops the supplying of erasing signal to head 300 and, with the circuit arrangement of FIG. 3, may also halt the recording operation of heads 25 and 106.

When it is desired to again initiate the recording or reproducing operation of apparatus 20, the "record" switch 303 or the "play" switch 111 is again closed and, through the mechanical interconnection indicated at 114, switch 112 is opened. The closing of switch 303 or 111 again causes driving of motor 35 in the direction indicated by the arrow 119' on FIGS. 1 and 2, whereby ring 32 is turned in the clockwise direction back to the position shown on FIG. 2 and the pinch roller assembly 57 is again acted upon by the pressing device 73 to engage the tape between the pinch rollers and capstan 66 for driving the tape which is once again engaged with the fixed magnetic head 106. The return of ring 32 to the position of FIG. 2 again closes switch 301 with the results indicated above.

When it is desired to halt the recording or reproducing operation of apparatus 20 and to return the tape to cassette 23, the "full stop" switch 113 is closed and, through the mechanical interconnection 114, the previously closed switch 111, 112 or 303 is opened. Closing of switch 113 effects displacement of reversing switch 113' through the mechanical interconnection 116 so that switch 113' is moved to the position shown in broken lines on FIG. 3 to close its contact *b*, and closing of switch 113 further causes opening of switch 113'' through the mechanical interconnection 118. Thus, if ring 32 is in its operative position shown on FIG. 2 when switch 113 is closed, the opening of switch 113'' again causes deenergizing of solenoid 95 to remove the force urging pinch roller assembly 57 against capstan 66, as described above in connection with the closing of switch 112. Further, closing of switch 113 completes a circuit for energizing motor 35 from source E through switches 113 and 108 to junction 124, through switch 112' and motor 35 in the direction of arrow 120, and then through conductor 122 and closed contact *b* of switch 113' back to the source E. Thus, motor 35 is rotated in the direction 120' on FIG. 2 to turn ring 32 in the counterclockwise direction. During such counterclockwise turning of ring 32, take-up reel 27 is conventionally driven in the direction for rewinding the tape thereon so that, as ring 32 turns from the position shown on FIG. 2 to the inactive position shown on FIG. 1, the tape loop L is progressively reduced in size until such loop completely disappears and the tape run $T_1$ again extends between guide pins 28 and 29 of cassette 23. When ring 32 returns to its inactive position of FIG. 1, switch operating member 109 engages actuator 108' of switch 108 to open the switch 108 and thereby interrupt the circuit for energizing motor 35. Thus, the turning of ring 32 is halted with all of the parts of the tape loading device 31 in their original or inactive positions shown on FIG. 1.

It will be apparent that during all of the movements of ring 32 to and from the position of FIG. 2, the switch 301 is in open condition so that, as the tape moves past erasing head 300 in response to such movement of ring 32, the erasing of signals from the tape or the recording of the erasing signal thereon in the form of noise is avoided. Thus, the operation of erasing head 300 can occur only with ring 32 in its operative position of FIG. 2, that is, when the tape is wrapped on drum 24 to the full extent.

Further, it will be obvious that the arrangement according to this invention for preventing operation of the erasing head during the loading or unloading of the tape on drum 24 can be applied to recording and reproducing apparatus with tape loading devices different from the particular device described above for illustrative purposes.

Although a specific embodiment of the invention has been described in detail herein with reference to the accompanying drawings, it is to be understood that the invention is not limited to that precise embodiment and that various changes and modifications may be effected therein by one skilled in the art without departing from the scope or spirit of this invention.

What is claimed is:

1. An apparatus for magnetically recording and reproducing signals on a magnetic tape extending between supply and take-up reels on which the tape is wound, comprising a guide drum having at least one rotary magnetic head associated therewith, tape loading means engageable, in an inactive position, with the tape between the reels and being movable from said inactive position to an operative position for withdrawing the tape from the reels and engaging the withdrawn tape about at least a portion of the periphery of said drum for scanning by said rotary head, a fixed magnetic erasing head located to engage the tape between said drum and the supply reel, circuit means operative to energize said erasing head for erasing signals on the tape moved therepast, and means actuable by said tape loading means for detecting the presence of said tape loading means in said operative position and for permitting operation of said circuit means only when said tape loading means is in said operative position, whereby to avoid erasing of signals on the tape during the movement of said tape loading means between said inactive and operative positions.

2. An apparatus according to claim 1, in which said means for detecting the presence of said tape loading means in said operative position includes switch means interposed in said circuit means and switch operating means connected with said tape loading means to actuate said switch means in said operative position of said tape loading means for rendering said circuit means operative to energize said erasing head.

3. An apparatus according to claim 2, in which said circuit means includes a first transistor operative as an oscillator to supply an erasing signal to said erasing head when the base of said first transistor is biased and a second transistor having conductive and non-conductive states and being connected with said first transistor to bias said base of the first transistor only when said second transistor is in said non-conductive state thereof, and in which said switch means is connected with said second transistor to provide said non-conductive state of the latter only when said switch means is actuated by said switch operating means.

4. An apparatus according to claim 2, further comprising second switch means which is manually actuable for initiating recording operation of said apparatus and for applying electrical power to said circuit means.

5. An apparatus according to claim 4, further comprising drive means for moving said tape loading means between said inactive and operative positions thereof including a reversible electric motor, and circuit means connected with said second switch means for operating said reversible electric motor in the direction for moving said tape loading means from said inactive position to said operative position in response to manual actuation of said second switch means.

6. An apparatus according to claim 2, further comprising a fixed recording and reproducing head disposed to engage the tape when said tape loading means is in said operative position, and means for supplying a bias current to said fixed recording and reproducing head from said circuit means upon actuation of said switch means.

7. An apparatus according to claim 2, in which said tape loading means includes a rotatable support extending around said guide drum, a plurality of guides mounted on said rotatable support and being spaced from said periphery of the drum to move with said support about said drum, and a tape engaging member also mounted on said rotatable support and extending from the latter to engage the tape between said reels in said inactive position and being movable with said support so that, during movement to said operative position, said tape engaging member withdraws a loop of said tape from said reels and wraps one side of the loop about said portion of the drum periphery while the other side of said loop is engaged with said guides, and in which said erasing head is disposed to engage said one side of the loop between said guide drum and said supply reel, and said switch operating means is mounted on said rotatable support.

* * * * *